US012272857B2

(12) United States Patent
Maruyama et al.

(10) Patent No.: US 12,272,857 B2
(45) Date of Patent: Apr. 8, 2025

(54) WAVEGUIDE MICROSTRIP LINE CONVERTER

(71) Applicant: Mitsubishi Electric Corporation, Tokyo (JP)

(72) Inventors: Takashi Maruyama, Tokyo (JP); Shigeo Udagawa, Tokyo (JP); Mitsuru Kirita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 390 days.

(21) Appl. No.: 17/789,214

(22) PCT Filed: Mar. 6, 2020

(86) PCT No.: PCT/JP2020/009796
§ 371 (c)(1),
(2) Date: Jun. 27, 2022

(87) PCT Pub. No.: WO2021/176712
PCT Pub. Date: Sep. 10, 2021

(65) Prior Publication Data

US 2023/0035534 A1 Feb. 2, 2023

(51) Int. Cl.
*H01P 5/107* (2006.01)
*H01P 5/02* (2006.01)
*H01P 5/10* (2006.01)

(52) U.S. Cl.
CPC .............. *H01P 5/107* (2013.01); *H01P 5/022* (2013.01); *H01P 5/1022* (2013.01)

(58) Field of Classification Search
CPC ........ H01P 5/022; H01P 5/1022; H01P 5/107; H03H 5/087
(Continued)

(56) References Cited

U.S. PATENT DOCUMENTS

2011/0267153 A1 11/2011 Hirota et al.
2016/0141740 A1 5/2016 Natsuhara et al.
(Continued)

FOREIGN PATENT DOCUMENTS

JP 5289551 B2 9/2013
JP 2015-146544 A 8/2015
(Continued)

OTHER PUBLICATIONS

International Search Report and Written Opinion mailed on Jun. 2, 2020, received for PCT Application PCT/JP2020/009796, filed on Mar. 6, 2020, 8 pages including English Translation.
(Continued)

*Primary Examiner* — Rakesh B Patel
(74) *Attorney, Agent, or Firm* — XSENSUS LLP

(57) ABSTRACT

A waveguide microstrip line converter includes: a waveguide; a dielectric substrate; a ground conductor provided with a slot; a line conductor; and a conductor located at a distance from the line conductor and adjacent to the line conductor. The line conductor includes a microstrip line, a conversion unit, a first impedance transforming unit, a second impedance transforming unit, and a third impedance transforming unit, the microstrip line having a first line width, the conversion unit being located immediately above the slot and having a second line width larger than the first line width, the first impedance transforming unit, the second impedance transforming unit, and the third impedance transforming unit extending in a first direction from the conversion unit and having a role in impedance matching between the microstrip line and the conversion unit. The conductor is adjacent to at least part of the conversion unit of the line conductor.

11 Claims, 10 Drawing Sheets

(58) Field of Classification Search
USPC .................... 333/32, 33, 124, 125, 202, 204
See application file for complete search history.

(56) References Cited

U.S. PATENT DOCUMENTS

| | | | |
|---|---|---|---|
| 2020/0388926 | A1 | 12/2020 | Maruyama et al. |
| 2021/0376438 | A1 | 12/2021 | Maruyama et al. |

FOREIGN PATENT DOCUMENTS

| | | | | | |
|---|---|---|---|---|---|
| WO | 2017/186099 | A1 | | 11/2017 | |
| WO | WO-2018116506 | A1 | * | 6/2018 | .............. H01P 5/028 |
| WO | 2019/138468 | A1 | | 7/2019 | |
| WO | 2019/142314 | A1 | | 7/2019 | |

OTHER PUBLICATIONS

Extended European Search Report issued Mar. 14, 2023 in corresponding European Patent Application No. 20923179.4, 12 pages.

* cited by examiner

WAVEGUIDE MICROSTRIP LINE CONVERTER

CROSS-REFERENCE TO RELATED APPLICATIONS

The present application is based on PCT filing PCT/JP2020/009796, filed Mar. 6, 2020, the entire contents of which are incorporated herein by reference.

FIELD

The present invention relates to a waveguide microstrip line converter capable of interconverting power that is propagated through a waveguide and power that is propagated through a microstrip line.

BACKGROUND

A waveguide microstrip line converter connects a waveguide and a microstrip line, and transmits a signal from the waveguide to the microstrip line or from the microstrip line to the waveguide. The waveguide microstrip line converter is widely used in antenna devices that transmit high-frequency signals in a microwave band or a millimeter wave band.

A waveguide microstrip line converter is known in which a ground conductor is provided on one of both surfaces of a dielectric substrate, and a microstrip line is provided on the other surface of both surfaces of the dielectric substrate. An open end of a waveguide is connected to the ground conductor. Patent Literature 1 discloses a waveguide microstrip line converter in which a ground conductor and a conductor plate connected to a microstrip line are electrically connected via a conduction structure embedded in a dielectric substrate. The conduction structure is formed with a plurality of through-holes arranged in such a way as to surround an open end of a waveguide.

CITATION LIST

Patent Literature

Patent Literature 1: Japanese Patent No. 5289551

SUMMARY

Technical Problem

The waveguide microstrip line converter is required to have high reliability and to have less leakage of electromagnetic waves from the waveguide microstrip line converter.

The present invention has been made in view of the above, and an object of the present invention is to obtain a waveguide microstrip line converter capable of improving reliability and reducing leakage of electromagnetic waves.

Solution to Problem

A waveguide microstrip line converter according to an aspect of the present invention includes: a waveguide having an open end: a dielectric substrate having a first surface and a second surface, the first surface facing the open end, the second surface being located on a side opposite to the first surface: a ground conductor provided on the first surface and connected to the open end, a slot being provided in a region of the ground conductor, the region being surrounded by an edge of the open end. The waveguide microstrip line converter according to the present invention includes: a first conductor provided on the second surface, the first conductor being a line conductor through which a signal is propagated; and a second conductor provided on the second surface, the second conductor being located at a distance from the first conductor and adjacent to the first conductor. The first conductor includes a first portion, a second portion, and a third portion, the first portion being a microstrip line having a first line width, the second portion being located immediately above the slot and having a second line width larger than the first line width, the third portion extending in a first direction from the second portion and having a role in impedance matching between the first portion and the second portion. The second conductor is adjacent to at least part of the second portion of the first conductor.

Advantageous Effects of Invention

The waveguide microstrip line converter according to the present invention achieves the effect of enabling improvement in reliability and reduction in leakage of electromagnetic waves.

DESCRIPTION OF EMBODIMENTS

Hereinafter, a waveguide microstrip line converter according to each embodiment of the present invention will be described in detail with reference to the drawings. Note that the present invention is not limited to the embodiments.

First Embodiment

Figure 1:
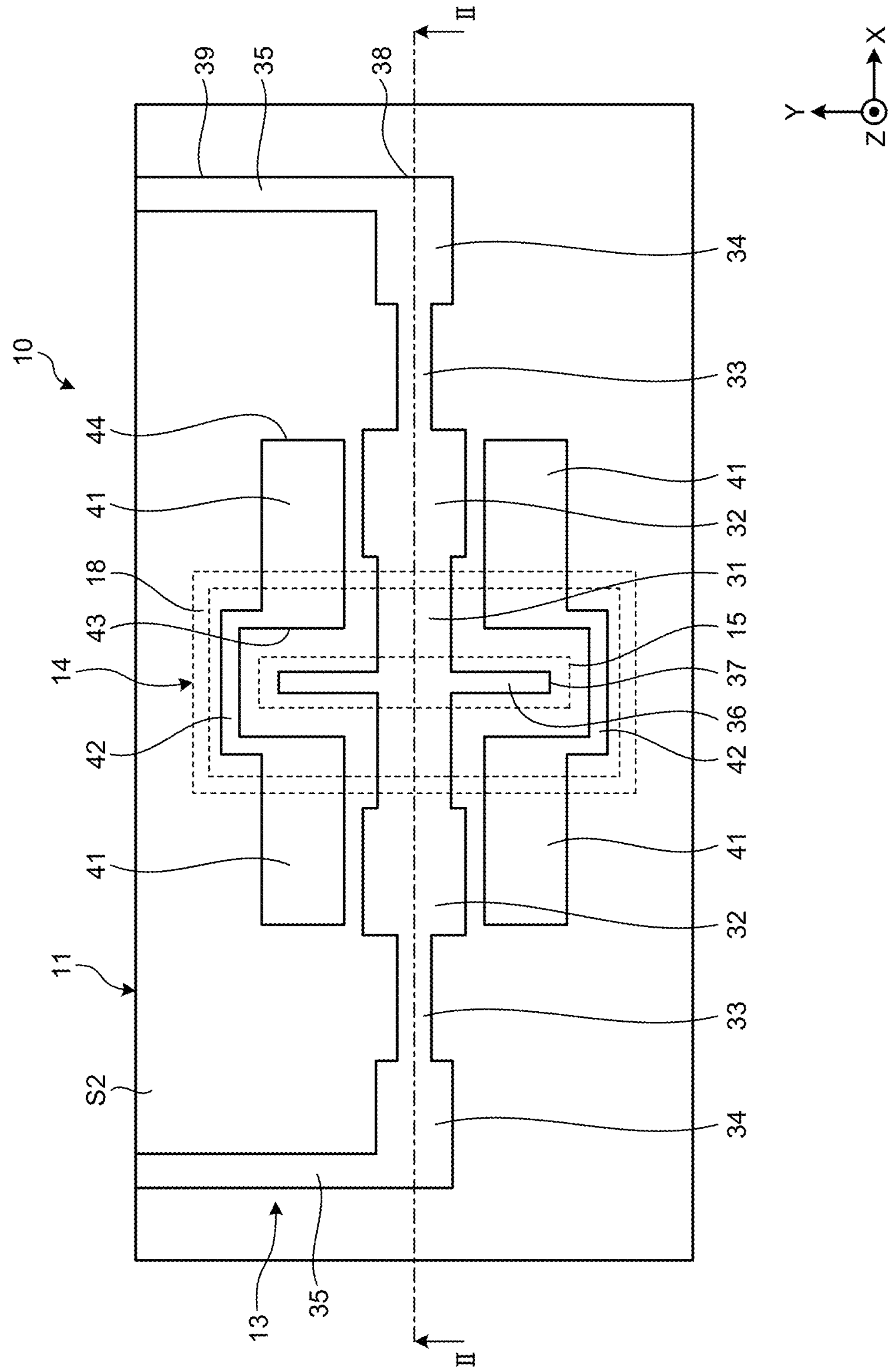
FIG. 1 is a top view of a waveguide microstrip line converter according to a first embodiment of the present invention, in which an external configuration of the waveguide microstrip line converter has been illustrated.
Figure 2:
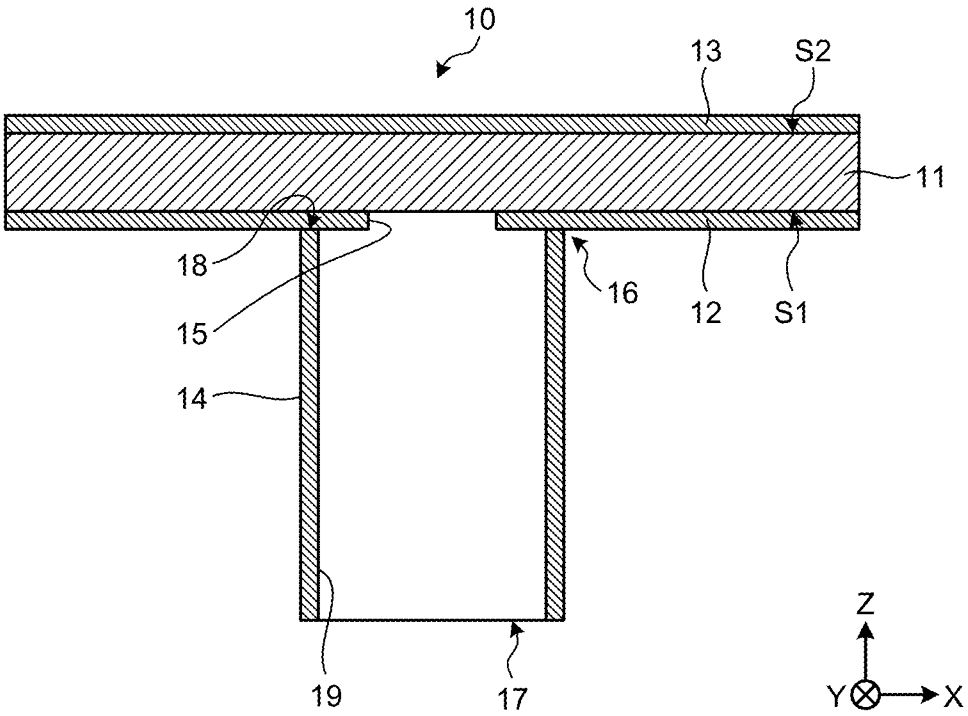
FIG. 2 is a cross-sectional view of the waveguide microstrip line converter according to the first embodiment, in which an internal configuration of the waveguide microstrip line converter has been illustrated.

FIG. 1 is a top view of a waveguide microstrip line converter 10 according to a first embodiment of the present invention, in which an external configuration of the waveguide microstrip line converter 10 has been illustrated. FIG. 2 is a cross-sectional view of the waveguide microstrip line converter 10 according to the first embodiment, in which an internal configuration of the waveguide microstrip line converter 10 has been illustrated. In FIG. 1, constituent elements provided on the back side of constituent elements indicated by solid lines in the drawing are indicated by broken lines.

An X-axis, a Y-axis, and a Z-axis are three axes perpendicular to each other. A direction parallel to the X-axis is defined as an X-axis direction which is a first direction. A direction parallel to the Y-axis is defined as a Y-axis direction which is a second direction. A direction parallel to the Z-axis is defined as a Z-axis direction which is a third direction. In the X-axis direction, a direction indicated by an arrow in the drawing is defined as a plus X direction, and a direction opposite to the plus X direction is defined as a minus X direction. In the Y-axis direction, a direction indicated by an arrow in the drawing is defined as a plus Y direction, and a direction opposite to the plus Y direction is defined as a minus Y direction. In the Z-axis direction, a direction indicated by an arrow in the drawing is defined as a plus Z direction, and a direction opposite to the plus Z direction is defined as a minus Z direction. The Z-axis direction is the direction of a tube axis of a waveguide 14. The tube axis is a center line of the waveguide 14.

The waveguide microstrip line converter 10 includes the waveguide 14, a dielectric substrate 11, and a ground conductor 12. The waveguide 14 has an open end 16. The dielectric substrate 11 has a first surface S1 and a second surface S2. The first surface S1 faces the open end 16. The second surface S2 is on a side opposite to the first surface S1. The waveguide microstrip line converter 10 includes a line conductor 13, four conductors 41, and two line conductors 42. The line conductor 13 is a first conductor. The conductors 41 are second conductors. The line conductors 42 are third conductors.

The ground conductor 12 is provided on the first surface S1. The open end 16 is connected to the ground conductor 12. The line conductor 13, the conductors 41, and the line conductors 42 are provided on the second surface S2. Note that FIG. 2 illustrates a portion centered on the waveguide 14 in the cross-sectional configuration of the waveguide microstrip line converter 10 taken along line II-II indicated in FIG. 1. A high-frequency signal is propagated through the line conductor 13.

The waveguide microstrip line converter 10 can interconvert power that is propagated through the waveguide 14 and power that is propagated through the line conductor 13. The waveguide 14 and the line conductor 13 are transmission lines for transmitting high-frequency signals. The ground conductor 12 has a slot 15. The slot 15 is formed in a region surrounded by an opening edge 18 which is an edge of the open end 16. Both the first surface S1 and the second surface S2 are surfaces parallel to the X-axis and the Y-axis.

Figure 3:
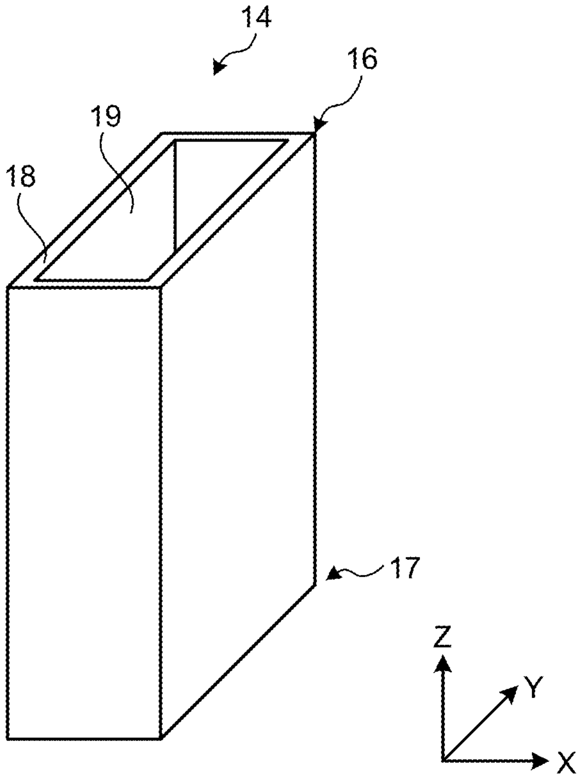
FIG. 3 is a perspective view of a waveguide included in the waveguide microstrip line converter illustrated in FIG. 1, in which an external configuration of the waveguide has been illustrated.

FIG. 3 is a perspective view of the waveguide 14 included in the waveguide microstrip line converter 10 illustrated in FIG. 1, in which an external configuration of the waveguide 14 has been illustrated. The waveguide 14 is a square-shaped waveguide having a rectangular XY-cross section, and is made of a hollow metal tube. The XY-cross section of the waveguide 14 is a rectangle having long sides parallel to the Y-axis and short sides parallel to the X-axis. In the waveguide 14, electromagnetic waves are propagated in an internal space surrounded by a tube wall 19 made of a metal material. The open end 16 is one end of the waveguide 14 in the tube axis direction, and has the opening edge 18 having the same shape as the XY-cross section of the waveguide 14. The opening edge 18 serves as a short-circuit surface to be connected to the ground conductor 12. A high-frequency signal to be propagated to the waveguide 14 is input to an input-output port 17, or a high-frequency signal propagated through the waveguide 14 is output from the input-output port 17. The input-output port 17 is the other end of the waveguide 14 in the tube axis direction.

Note that connection of the opening edge 18 and the ground conductor 12 is not limited to connection resulting from direct contact between the ground conductor 12 and the opening edge 18. The opening edge 18 and the ground conductor 12 just need to be connected in such a way as to allow conversion of a high-frequency signal, and may be noncontact with each other. The opening edge 18 and the ground conductor 12 may be connected to each other by a choke structure or the like provided between the opening edge 18 and the ground conductor 12.

The dielectric substrate 11 is a flat plate member made of a resin material. The ground conductor 12 is provided on the entire first surface S1 of the dielectric substrate 11. The slot 15 is formed by removal of a conductor that is the material of the ground conductor 12, in an XY-region surrounded by the opening edge 18 of the open end 16 of the ground conductor 12. In one example, the ground conductor 12 is formed by the crimping of copper foil, which is conductive metal foil, onto the first surface S1. The ground conductor 12 may be a metal plate formed in advance and then attached to the dielectric substrate 11. The slot 15 is formed by a patterning of the copper foil crimped onto the first surface S1.

The line conductor 13 is provided on the second surface S2 of the dielectric substrate 11 in such a way as to pass immediately above an opening of the waveguide 14. The line conductor 13 is formed by the patterning of copper foil crimped onto the second surface S2. The line conductor 13 may be a metal plate formed in advance and then attached to the dielectric substrate 11.

In the first embodiment, the waveguide 14 may have any configuration. The waveguide 14 may include a dielectric substrate with a plurality of through-holes formed therein, instead of the tube wall 19 made of a metal material. Furthermore, the waveguide 14 may be configured such that an internal space surrounded by the tube wall 19 is filled with a dielectric material. The waveguide 14 may be a waveguide having a shape with rounded corners in the XY-cross section, a waveguide having a cocoon shape in cross section, or a ridge waveguide.

Figure 4:
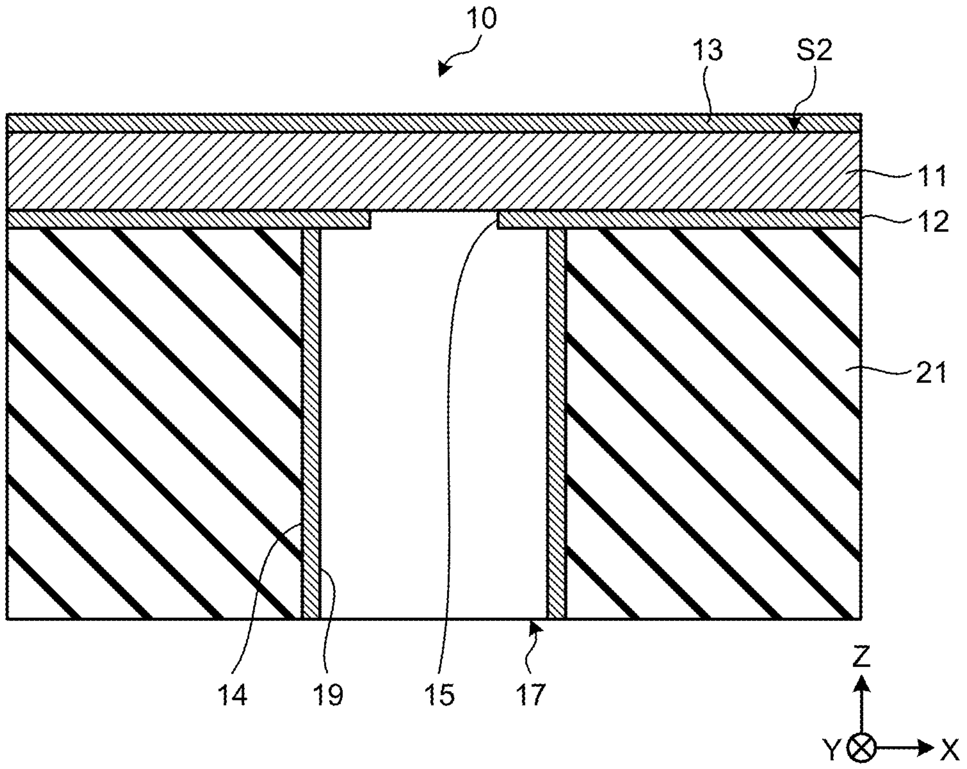
FIG. 4 is a cross-sectional view of the waveguide microstrip line converter according to the first embodiment, in which one application example of the waveguide microstrip line converter has been illustrated.

FIG. 4 is a cross-sectional view of the waveguide microstrip line converter 10 according to the first embodiment, in which one application example of the waveguide microstrip line converter 10 has been shown. In the application example shown in FIG. 4, the waveguide microstrip line converter 10 is mounted on a dielectric substrate 21. FIG. 4 illustrates a cross-sectional configuration in which the dielectric substrate 21 has been added to the cross-sectional configuration illustrated in FIG. 2. The dielectric substrate 21 is a flat plate member made of a resin material.

The surface of the dielectric substrate 21 is overlaid with the ground conductor 12. The waveguide 14 is provided in such a way as to penetrate between the front surface and back surface of the dielectric substrate 21. The input-output port 17 is open on the back surface of the dielectric substrate 21. The waveguide 14 may be a single through-hole formed in the dielectric substrate 21. A hole is formed by penetration of the dielectric substrate 21 in the Z-axis direction, and a side surface of the hole is plated with a conductive material. As a result, the waveguide 14 is formed as a single through-hole.

The waveguide microstrip line converter 10 may be provided with a plurality of through-holes formed in such a way as to penetrate between the front surface and back surface of the dielectric substrate 21, instead of the waveguide 14. The plurality of through-holes is arranged along a shape such as a rectangle or a cocoon shape. Even in a case where a plurality of through-holes is provided, the waveguide microstrip line converter 10 can transmit high-frequency signals as in a case where the waveguide 14 is provided.

Figure 5:
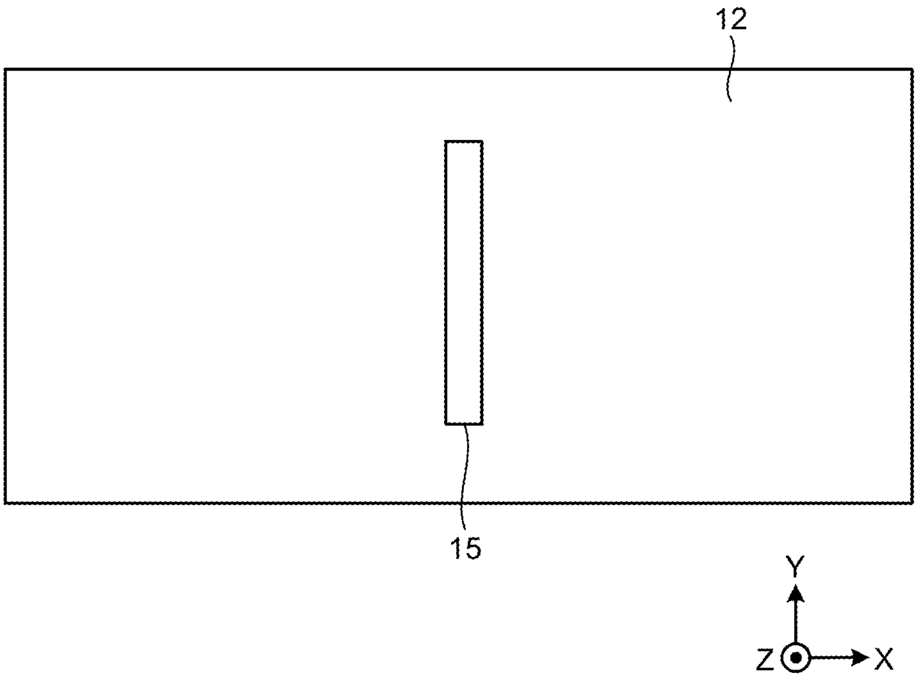
FIG. 5 is a plan view of a ground conductor included in the waveguide microstrip line converter illustrated in FIG. 1.

FIG. 5 is a plan view of the ground conductor 12 included in the waveguide microstrip line converter 10 illustrated in FIG. 1. The slot 15 is an opening portion formed by removal of part of the ground conductor 12. The slot 15 has a planar shape that is longer in the Y-axis direction than in the X-axis direction. The slot 15 has a rectangular shape with long sides parallel to the Y-axis and short sides parallel to the X-axis in a plan view. The waveguide microstrip line converter 10 may be provided with a slot having any shape as long as radiation of electromagnetic waves is possible at an allowable level. The slot 15 may have a planar shape with rounded corners, a cocoon-like planar shape, or a ridge shape.

The line conductor 13 includes two microstrip lines 35 that are first portions, a conversion unit 31 that is a second portion, and two third portions. Each of the third portions is located between a corresponding one of the first portions and the second portion. The conversion unit 31 is located immediately above the slot 15. Each of the third portions includes a plurality of impedance transforming units, that is, first, second, and third impedance transforming units 32, 34, and 33. Each of the first, second, and third impedance transforming units 32, 34, and 33 has a role in impedance matching between the microstrip line 35 and the conversion unit 31. In addition, the line conductor 13 includes two stubs 36 which are branch portions branching from the conversion unit 31.

The microstrip line 35 is a line extending in the Y-axis direction. The microstrip line 35 has a role in inputting high-frequency signals from the outside of the waveguide microstrip line converter 10 to the waveguide microstrip line converter 10 and outputting high-frequency signals from the waveguide microstrip line converter 10 to the outside.

The conversion unit 31 is located at the center of the line conductor 13 in the X-axis direction. The conversion unit 31 has a role in power conversion between the line conductor 13 and the waveguide 14. Each of the first impedance transforming units 32 is located adjacent to the conversion unit 31 in the X-axis direction. The first impedance transforming unit 32 is connected to the conversion unit 31. Each of the second impedance transforming unit 34 is located adjacent to the corresponding one of microstrip lines 35 in the Y-axis direction. The second impedance transforming unit 34 is connected to the microstrip line 35. Each of the third impedance transforming units 33 is located between a corresponding one of the first impedance transforming units 32 and the corresponding second impedance transforming unit 34. The third impedance transforming unit 33 is connected to the first impedance transforming unit 32 and the second impedance transforming unit 34. The line widths of impedance transforming units connected to each other among the first, second, and third impedance transforming units 32, 34, and 33 are different from each other.

The two stubs 36 are provided at the center of the conversion unit 31 in the X-axis direction. One of the stubs 36 extends in the plus Y direction from an end of the conversion unit 31, the end being located on the plus Y direction side. The other stub 36 extends in the minus Y direction from an end of the conversion unit 31, the end being located on the minus Y direction side. An end 37 of each stub 36 is an open end. The end 37 of each stub 36 is located on a side opposite to a side where the conversion unit 31 is located. The center position of each stub 36 in the X-axis direction coincides with the center position of the slot 15 in the X-axis direction. An end 38 is an end of the second impedance transforming unit 34 in the X-axis direction. An end 39 is an end of the microstrip line 35 in the X-axis direction.

Each conductor 41 is located at a distance from the line conductor 13 and adjacent to the line conductor 13. Each line conductor 42 connects one of the four conductors 41 and another of the four conductors 41. Each conductor 41 has two ends 43 and 44 in the X-axis direction. The end 43 is an end located on a side where the slot 15 is located. The end 44 is an end located on a side opposite to the end 43. The conductors 41 and the line conductors 42 are provided at a distance from the line conductor 13. The line conductor 13 is not electrically connected with the conductors 41 and the line conductors 42. The conductors 41 and the line conductors 42 have the function of reducing radiation of electromagnetic waves from the waveguide microstrip line converter 10.

Figure 6:
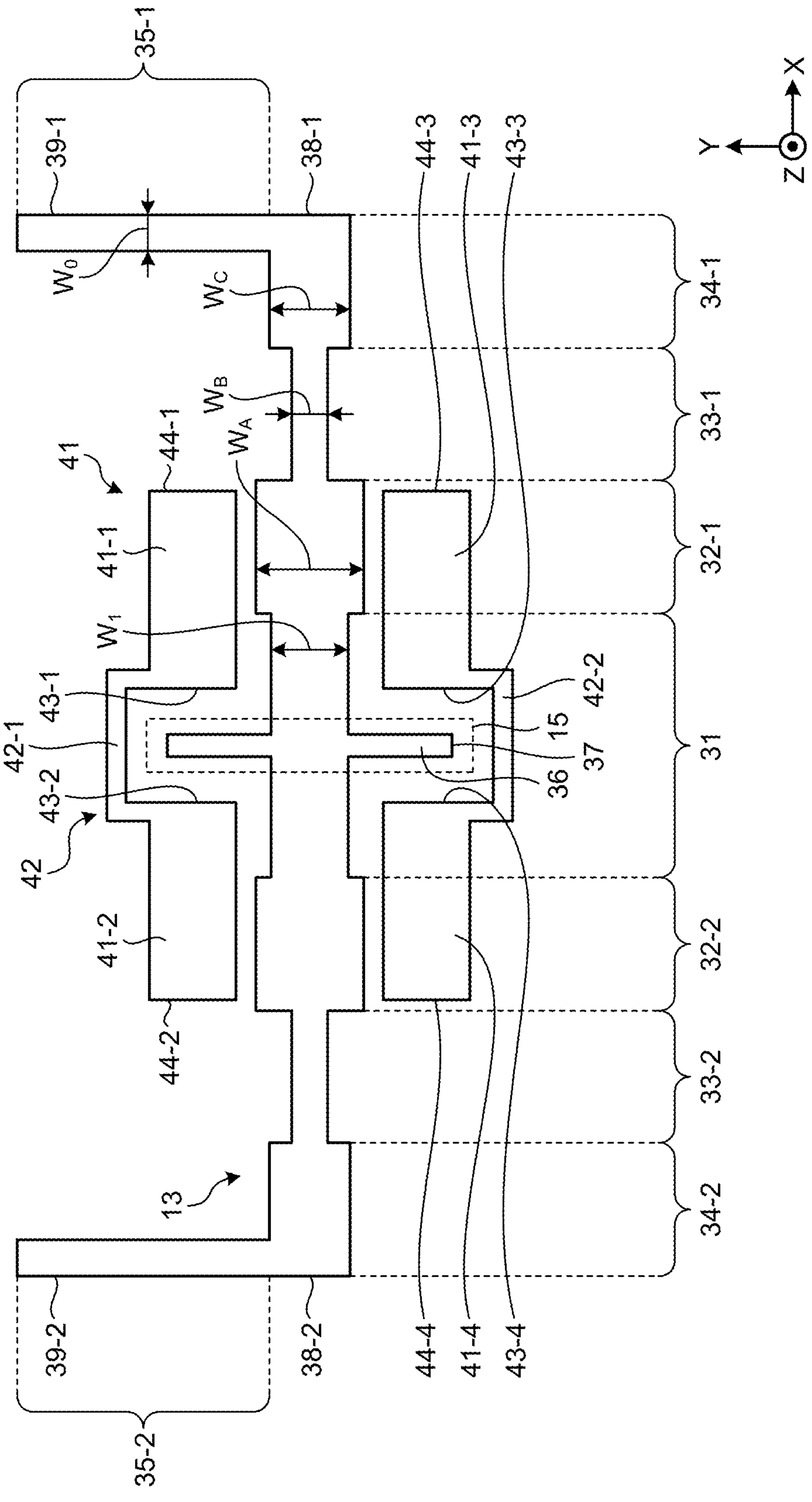
FIG. 6 is a plan view of line conductors and conductors included in the waveguide microstrip line converter illustrated in FIG. 1.

FIG. 6 is a plan view of the line conductors 13 and 42 and the conductors 41 included in the waveguide microstrip line converter 10 illustrated in FIG. 1. For reference, the slot 15 is indicated by a broken line in FIG. 6.

A third portion is provided on both sides of the conversion unit 31 in the line conductor 13. One of the third portions is located on the plus X direction side of the conversion unit 31. The other third portion is located on the minus X direction side of the conversion unit 31. The plus X direction side is one side in the X-axis direction. The minus X direction side is the other side in the X-axis direction. The third portion located on the plus X direction side of the conversion unit 31 includes first, second, and third impedance transforming units 32-1, 34-1, and 33-1. The third portion located on the minus X direction side of the conversion unit 31 includes first, second, and third impedance transforming units 32-2, 34-2, and 33-2. Note that the first impedance transforming units 32-1 and 32-2 are each referred to as the first impedance transforming unit 32 when not distinguished from each other. The second impedance transforming units 34-1 and 34-2 are each referred to as the second impedance transforming unit 34 when not distinguished from each other. The third impedance transforming units 33-1 and 33-2 are each referred to as the third impedance transforming unit 33 when not distinguished from each other.

A microstrip line 35-1 extends in the Y-axis direction from one of the two third portions, which is located on the plus X direction side. A microstrip line 35-2 extends in the Y-axis direction from one of the two third portions, which is located on the minus X direction side. The microstrip line 35-1 extends in the plus Y direction from the second impedance transforming unit 34-1. The microstrip line 35-2 extends in the plus Y direction from the second impedance transforming unit 34-2. Note that the microstrip lines 35-1 and 35-2 are each referred to as the microstrip line 35 when not distinguished from each other.

The second impedance transforming unit 34-1 has an end 38-1 on the plus X direction side. The end 38-1 is an end of the third portion located on the plus X direction side. The microstrip line 35-1 is connected to the end 38-1, and extends in the Y-axis direction. The microstrip line 35-1 has an end 39-1 on the plus X direction side. The end 38-1 and the end 39-1 form a straight line in the Y-axis direction.

The second impedance transforming unit 34-2 has an end 38-2 on the minus X direction side. The end 38-2 is an end of the third portion located on the minus X direction side. The microstrip line 35-2 is connected to the end 38-2, and extends in the Y-axis direction. The microstrip line 35-2 has an end 39-2 on the minus X direction side. The end 38-2 and the end 39-2 form a straight line in the Y-axis direction.

In the first embodiment, a description that the microstrip line 35 is connected to the end 38 of the third portion, and extends in the Y-axis direction refers to a state where the microstrip line 35 is provided such that the end 39 of the microstrip line 35 and the end 38 of the third portion form a straight line. Note that the ends 38-1 and 38-2 are each referred to as the end 38 when not distinguished from each other. The ends 39-1 and 39-2 are each referred to as the end 39 when not distinguished from each other.

The width of the line conductor 13 in a direction perpendicular to the direction of the transmission line is defined as line width. The length of the line conductor 13 in the direction of the transmission line is defined as line length. In the line conductor 13, the conversion unit 31 and the first, second, and third impedance transforming units 32, 34, and 33 form a transmission line extending in the X-axis direction. In the conversion unit 31 and the first, second, and third impedance transforming units 32, 34, and 33, line width refers to width in the Y-axis direction, and line length refers to length in the X-axis direction. In the line conductor 13, the microstrip line 35 forms a transmission line extending in the Y-axis direction. In the microstrip line 35, line width refers to width in the X-axis direction, and line length refers to length in the Y-axis direction. Also for the stub 36, line width refers to width in the X-axis direction, and line length refers to length in the Y-axis direction.

The conversion unit 31, the first impedance transforming units 32, the second impedance transforming units 34, and the third impedance transforming units 33, the microstrip lines 35, and the stubs 36 are formed of metal foil or a metal plate which is an integrated metal member. The conversion unit 31, the first impedance transforming units 32, the second impedance transforming units 34, and the third impedance transforming units 33, and the microstrip lines 35 are formed such that the line widths of adjacent portions are different from each other.

When $W_0$ denotes a first line width defined as the line width of the microstrip line 35, and $W_1$ denotes a second line width defined as the line width of the conversion unit 31, $W_1$ is larger than $W_0$. That is, the following relationship holds between $W_1$ and $W_0$: $W_1>W_0$. When $\lambda$ denotes the wavelength of a high-frequency signal to be propagated through the line conductor 13, the conversion unit 31 has a line length of $\lambda/2$. The microstrip line 35 may have any line length.

The line width of the first impedance transforming unit 32 is denoted as $W_A$, and $W_A$ is larger than $W_0$. That is, the following relationship holds between $W_A$ and $W_0$: $W_A>W_0$. The magnitude relationship between $W_A$ and $W_0$ may be freely set. The line width of the third impedance transforming unit 33 is denoted as $W_B$, and $W_B$ is equal to $W_0$ and smaller than $W_A$. That is, the following relationship holds between $W_B$, $W_0$, and $W_A$: $W_A>W_B=W_0$. The line width of the second impedance transforming unit 34 is denoted as $W_C$, and $W_C$ is larger than both $W_B$ and $W_0$. Furthermore, $W_C$ is smaller than $W_A$. That is, the following relationship holds between $W_C$, $W_B$, $W_0$, and $W_A$: $W_A>W_C>W_B=W_0$. The first, second, and third impedance transforming units 32, 34, and 33 each have a line length of $\lambda/4$. The stub 36 has a line length of $\lambda/4$.

A conductor 41-1 is located on the plus X direction side with respect to the center of the conversion unit 31 in the X-axis direction, and on the plus Y direction side with respect to the conversion unit 31 and the first impedance transforming unit 32-1. The conductor 41-1 is adjacent to the first impedance transforming unit 32-1 and part of the conversion unit 31 in the line conductor 13. The conductor 41-1 is located at a distance from the first impedance transforming unit 32-1 and the part of the conversion unit 31, and is adjacent to the first impedance transforming unit 32-1 and the part of the conversion unit 31.

A conductor 41-2 is located on the minus X direction side with respect to the center of the conversion unit 31 in the X-axis direction, and on the plus Y direction side with respect to the conversion unit 31 and the first impedance transforming unit 32-2. The conductor 41-2 is adjacent to the first impedance transforming unit 32-2 and part of the conversion unit 31 in the line conductor 13. The conductor 41-2 is located at a distance from the first impedance transforming unit 32-2 and the part of the conversion unit 31 and, and is adjacent to the first impedance transforming unit 32-2 and the part of the conversion unit 31.

A conductor 41-3 is located on the plus X direction side with respect to the center of the conversion unit 31 in the X-axis direction, and on the minus Y direction side with respect to the conversion unit 31 and the first impedance transforming unit 32-1. The conductor 41-3 is adjacent to the first impedance transforming unit 32-1 and part of the conversion unit 31 in the line conductor 13. The conductor 41-3 is located at a distance from the first impedance transforming unit 32-1 and part of the conversion unit 31, and is adjacent to the first impedance transforming unit 32-1 and the part of the conversion unit 31.

A conductor 41-4 is located on the minus X direction side with respect to the center of the conversion unit 31 in the X-axis direction, and on the minus Y direction side with respect to the conversion unit 31 and the first impedance transforming unit 32-2. The conductor 41-4 is adjacent to the first impedance transforming unit 32-2 and part of the conversion unit 31 in the line conductor 13. The conductor 41-4 is located at a distance from the first impedance transforming unit 32-2 and the part of the conversion unit 31, and is adjacent to the first impedance transforming unit 32-2 and the part of the conversion unit 31.

Note that the conductors 41-1, 41-2, 41-3, and 41-4 are each referred to as the conductor 41 when not distinguished from each other. As an example, the conductor 41 has a rectangular shape that is longer in the X-axis direction than in the Y-axis direction. As an example, the conductor 41 has a length of $\lambda/4$ or more and $\lambda/2$ or less in the X-axis direction.

The conductor 41-1 has an end 43-1 on the minus X direction side. The conductor 41-1 has an end 44-1 on the plus X direction side. Each of the end 43-1 and the end 44-1 is a side of a rectangle parallel to the Y-axis. The conductor 41-2 has an end 43-2 on the plus X direction side. The conductor 41-2 has an end 44-2 on the minus X direction side. Each of the end 43-2 and the end 44-2 is a side of a rectangle parallel to the Y-axis.

The conductor 41-3 has an end 43-3 on the minus X direction side. The conductor 41-3 has an end 44-3 on the plus X direction side. Each of the end 43-3 and the end 44-3 is a side of a rectangle parallel to the Y-axis. The conductor 41-4 has an end 43-4 on the plus X direction side. The conductor 41-4 has an end 44-4 on the minus X direction side. Each of the end 43-4 and the end 44-4 is a side of a rectangle parallel to the Y-axis.

Note that the ends 43-1, 43-2, 43-3, and 43-4 are each referred to as the end 43 when not distinguished from each other. The end 43 is an open end. The ends 44-1, 44-2, 44-3, and 44-4 are each referred to as the end 44 when not distinguished from each other. The end 44 is an open end.

A line conductor 42-1 is located on the plus Y direction side with respect to the center of the conversion unit 31 in the Y direction. The line conductor 42-1 connects the conductor 41-1 and the conductor 41-2. A portion of the line conductor 42-1 connected to the conductor 41-1 extends in the plus Y direction from an end portion of the conductor 41-1, the end portion being located on the minus X direction side. A portion of the line conductor 42-1 connected to the conductor 41-2 extends in the plus Y direction from an end portion of the conductor 41-2, the end portion being located on the plus X direction side. The line conductor 42-1 has a linear portion parallel to the X-axis. The linear portion connects the portion of the line conductor 42-1 extending in the plus Y direction from the conductor 41-1 and the portion of the line conductor 42-1 extending in the plus Y direction from the conductor 41-2.

A line conductor 42-2 is located on the minus Y direction side with respect to the center of the conversion unit 31 in the Y direction. The line conductor 42-2 connects the conductor 41-3 and the conductor 41-4. A portion of the line conductor 42-2 connected to the conductor 41-3 extends in the minus Y direction from an end portion of the conductor 41-3, the end portion being located on the minus X direction side. A portion of the line conductor 42-2 connected to the conductor 41-4 extends in the minus Y direction from an end portion of the conductor 41-4, the end portion being located on the plus X direction side. The line conductor 42-2 has a linear portion parallel to the X-axis. The linear portion connects the portion of the line conductor 42-2 extending in the minus Y direction from the conductor 41-3 and the portion of the line conductor 42-2 extending in the minus Y direction from the conductor 41-4.

Note that the line conductors 42-1 and 42-2 are each referred to as the line conductor 42 when not distinguished from each other. The line conductor 42 is shaped such that the line conductor 42 is bent at a right angle at two points. For a portion of the line conductor 42 extending in the Y-axis direction, line length refers to length in the Y-axis direction, and line width refers to width in the X-axis direction. For a portion of the line conductor 42 extending in the X-axis direction, line length refers to length in the X-axis direction, and line width refers to width in the Y-axis direction. The line conductor 42 may have any line width. As an example, the line width of the line conductor 42 is smaller than $W_0$. The line length of the line conductor 42 is approximately $\lambda/2$.

The conductors 41 and the line conductor 42 are formed by the patterning of copper foil crimped onto the second surface S2. The conductors 41 and the line conductor 42 may be a metal plate formed in advance and then attached to the dielectric substrate 11.

Next, operation of the waveguide microstrip line converter 10 will be described with reference to FIGS. 1 to 6. Here, a case where a high-frequency signal propagated through the waveguide 14 is propagated to the microstrip line 35 is taken as an example.

An electromagnetic wave propagated inside the waveguide 14 reaches the ground conductor 12. The electromagnetic wave having reached the ground conductor 12 is propagated to the conversion unit 31 through the slot 15. Note that propagation of electromagnetic waves to the conversion unit 31 includes generation of energy of the electromagnetic waves between the ground conductor 12 and the conversion unit 31. The electromagnetic wave propagated to the conversion unit 31 is propagated from the conversion unit 31 in the plus X direction and in the minus X direction.

An electromagnetic wave propagated in the plus X direction from the conversion unit 31 through the first impedance transforming unit 32-1, the third impedance transforming unit 33-1, and the second impedance transforming unit 34-1, is propagated in the plus Y direction through the microstrip line 35-1. An electromagnetic wave propagated in the minus X direction from the conversion unit 31 through the first impedance transforming unit 32-2, the third impedance transforming unit 33-2, and the second impedance transforming unit 34-2, is propagated in the plus Y direction through the microstrip line 35-2. The waveguide microstrip line converter 10 outputs a high-frequency signal propagated in the plus Y direction from each of the microstrip line 35-1 and the microstrip line 35-2. The phase of a high-frequency signal output from the microstrip line 35-1 and the phase of a high-frequency signal output from the microstrip line 35-2 are opposite to each other.

In a case where a high-frequency signal is propagated by electromagnetic coupling in a configuration in which a line is divided by a fine gap that is provided in a conductor of a portion corresponding to the conversion unit 31, an error in line length may be caused when a defect in processing the gap occurs. In contrast, in the line conductor 13 of the first embodiment, portions from the conversion unit 31 to the microstrip line 35 are formed of an integrated metal member. In the first embodiment, because it is not necessary to form a gap in the line conductor 13, the problem of defect in processing a gap can be avoided, and the line conductor 13 can be easily processed.

The conversion unit 31, the first, second, and third impedance transforming units 32, 34, and 33, and the microstrip line 35 have characteristic impedance corresponding to the respective line widths. The characteristic impedance of the conversion unit 31 is denoted as $Z_1$, which corresponds to $W_1$ that is the line width of the conversion unit 31. The characteristic impedance of the microstrip line 35 is denoted as $Z_0$, which corresponds to $W_0$ that is the line width of the microstrip line 35. Here, $Z_1$ is smaller than $Z_0$. That is, the following relationship holds between Z and $Z_0$: $Z_1<Z_0$. There is a large difference in line width between the conversion unit 31 and the microstrip line 35. Therefore, if the microstrip line 35 is directly adjacent to the conversion unit 31, reflection increases due to a mismatch between the characteristic impedance of the conversion unit 31 and the characteristic impedance of the microstrip line 35. An increase in reflection causes a decrease in power that is propagated from the waveguide 14 to the microstrip line 35 and power that is propagated from the microstrip line 35 to the waveguide 14.

The first, second, and third impedance transforming units 32, 34, and 33 each have a role in impedance matching between the conversion unit 31 and the microstrip line 35. The characteristic impedance of the first impedance transforming unit 32 is denoted as $Z_A$, which corresponds to $W_A$ that is the line width of the first impedance transforming unit 32. Here, $Z_A$ is smaller than $Z_0$. That is, the following relationship holds between $Z_A$ and $Z_0$: $Z_A<Z_0$.

The characteristic impedance of the third impedance transforming unit 33 is denoted as $Z_B$, which corresponds to $W_B$ that is the line width of the third impedance transforming unit 33. Here, $Z_B$ is equal to $Z_0$ and greater than $Z_A$. That is, the following relationship holds between $Z_B$, $Z_0$, and $Z_A$: $Z_A<Z_B=Z_0$. The characteristic impedance of the second impedance transforming unit 34 is denoted as $Z_C$, which corresponds to $W_C$ that is the line width of the second impedance transforming unit 34. Here, $Z_C$ is smaller than both $Z_B$ and $Z_0$. That is, the following relationship holds between $Z_C$, $Z_B$, and $Z_0$: $Z_C<Z_B=Z_0$.

In the first embodiment, the first and second impedance transforming units 32 and 34 each having a line width larger than the line width of the microstrip line 35 are provided in the waveguide microstrip line converter 10. The waveguide microstrip line converter 10 thus achieves impedance matching between the conversion unit 31 and the microstrip line 35. The waveguide microstrip line converter 10 can reduce power loss by impedance matching between the conversion unit 31 and the microstrip line 35.

In addition, the third impedance transforming units 33 and the second impedance transforming units 34 fulfill the function of reducing an impedance mismatch due to a difference in line width between the first impedance transforming units 32 and the microstrip lines 35. The line conductor 13 includes the first, second, and third impedance transforming units 32, 34, and 33 that are portions with different line widths set in a stepwise manner, so that it is possible to mitigate a steep change in impedance in transmission of electromagnetic waves. As a result, the waveguide microstrip line converter 10 can effectively reduce power loss. In addition, the waveguide microstrip line converter 10 can handle signals in a wide frequency band by mitigating a change in impedance in the line conductor 13.

Note that while the magnitude relationship between $W_1$ and $W_A$ may be freely set, the following relationship holds in the examples illustrated in FIGS. 1 and 6: $W_1<W_A$. If the relationship "$W_1>W_A$" holds, the line width "$W_1$" of the conversion unit 31 is the largest of the line widths of the line conductor 13. Assuming that $W_A$ has the same value as that in this case and $W_1$ is reduced so that the relationship "$W_1<W_A$" holds, the line width "$W_A$" of the first impedance transforming unit 32 is the largest of the line widths of the line conductor 13. Furthermore, a change in line width between the conversion unit 31 and the microstrip line 35 is smaller in this case than in a case where the relationship "$W_1>W_A$" holds. Therefore, the waveguide microstrip line converter 10 can handle signals in a wider frequency band when the relationship "$W_1<W_A$" holds.

The line width of the third impedance transforming unit 33 may be different from the line width of the microstrip line 35. The line width "$W_B$" of the third impedance transforming unit 33 just needs to satisfy the relationships "$W_A>W_B$" and "$W_C>W_B$", and may be different from the line width "$W_0$" of the microstrip line 35. In addition, the number of impedance transforming units which are portions each having a line width larger than that of the microstrip line 35 is not limited to two, and may be one or more than two.

In the first embodiment, the microstrip line 35 extends in the Y-axis direction from the end 38 such that the end 38 of the second impedance transforming unit 34 and the end 39 of the microstrip line 35 form one straight line. A portion between the second impedance transforming unit 34 and the microstrip line 35 where line width is discontinuous is integrated with a bent portion of the transmission line between the second impedance transforming unit 34 and the microstrip line 35.

If the microstrip line 35 having a constant line width includes a bent portion between a portion extending in the X-axis direction and a portion extending in the Y-axis direction, unnecessary electromagnetic wave radiation may be caused at the portion between the second impedance transforming unit 34 and the microstrip line 35 where line width is discontinuous and at the bent portion of the transmission line. In the waveguide microstrip line converter 10, the portion where line width is discontinuous is integrated with the bent portion of the transmission line. As a result, it is possible to reduce the number of portions where unnecessary electromagnetic wave radiation may be caused. This enables the waveguide microstrip line converter 10 to reduce power loss due to unnecessary electromagnetic wave radiation in the configuration in which a high-frequency signal is transmitted in the Y-axis direction perpendicular to the X-axis direction that is the direction of transmission from the conversion unit 31.

In FIG. 6, the center position of each stub 36 in the X-axis direction coincides with the center position of the slot 15 in the X-axis direction. In this case, because the line conductor 13 has symmetry with respect to the center of the slot 15, power is not propagated to the two stubs 36. However, misalignment of the center position of the slot 15 and the center position of the stub 36 in the X-axis direction may be caused by a manufacturing error of the waveguide microstrip line converter 10, or the like.

An electric field is generated in the stub 36 in association with the misalignment of the position of the line conductor 13 and the position of the slot 15. Because the end 37 of the stub 36 is an open end, a boundary condition that the electric field is zero at a connecting portion between the stub 36 and the conversion unit 31 is satisfied. As a result, electrical symmetry in the line conductor 13 is ensured, so that the phases of high-frequency signals output from the two microstrip lines 35 are opposite to each other. As described above, the stubs 36 provided in the waveguide microstrip line converter 10 can reduce the effect of the misalignment of the position of the line conductor 13 and the position of the slot 15 on high-frequency signals. The electrical symmetry ensured by use of the two stubs 36 enables the line conductor 13 to reduce a variation in the phases of high-frequency signals in the microstrip lines 35-1 and 35-2.

Note that the number of the stubs 36 to be provided in the line conductor 13 may be one. When a single stub 36 is provided, the stub 36 may be provided at either end of the conversion unit 31, that is, the end on the plus Y direction side or the end on the minus Y direction side. Furthermore, it is not necessary to provide the stub 36 as long as there is no problem in performance of the waveguide microstrip line converter 10.

Because part of the conversion unit 31 and the first impedance transforming unit 32 of the line conductor 13 are adjacent to the conductor 41, the conductor 41 is disposed at a position close to the slot 15, the conversion unit 31, and the first impedance transforming unit 32. Therefore, a high-frequency signal is generated between the conductor 41 and the ground conductor 12 by electromagnetic coupling between the conductor 41 and the slot 15, the conversion unit 31, and the first impedance transforming unit 32. A high-frequency signal generated in the slot 15, the conversion unit 31, and the first impedance transforming unit 32 includes a component to be propagated in the plus X direction or the minus X direction. Therefore, the high-frequency signal generated between the conductor 41 and the ground conductor 12 is propagated mainly in the plus X direction or the minus Y direction. The high-frequency signal propagated to the conductor 41 is emitted from the end 43 or the end 44.

In a case where the phase of high-frequency signals emitted from each portion where line width is discontinuous in the conversion unit 31 and the first, second, and third impedance transforming units 32, 34, and 33 or emitted from the ends 38 is different from the phase of high-frequency signals emitted from the ends 43 or the ends 44, the emitted high-frequency signals cancel each other. When the emitted high-frequency signals cancel each other, the waveguide microstrip line converter 10 can reduce radiation of electromagnetic waves from the entire waveguide microstrip line converter 10.

The line conductor 42-1 transmits, to the conductor 41-2, part of a high-frequency signal propagated through the conductor 41-1 and emitted from the end 43-1. Similarly, the line conductor 42-1 transmits, to the conductor 41-1, part of a high-frequency signal propagated through the conductor 41-2 and emitted from the end 43-2. If the line conductor 42-1 is not provided, the phase of the high-frequency signal emitted from the end 43-1 and the phase of the high-frequency signal emitted from the end 43-2 are opposite to each other due to the symmetry of the structure. Because the line length of the line conductor 42-1 is approximately λ/2, the phase of the high-frequency signal reaching the conductor 41-2 from the conductor 41-1 via the line conductor 42-1 is inverted while the high-frequency signal is propagated through the line conductor 42-1. Therefore, the phase of the high-frequency signal propagated from the conductor 41-1 to the conductor 41-2 is the same as the phase of the high-frequency signal propagated through the conductor 41-2 and emitted from the end 43-2. Similarly, the phase of the high-frequency signal propagated from the conductor 41-2 to the conductor 41-1 is the same as the phase of the high-frequency signal propagated through the conductor 41-1 and emitted from the end 43-1. Therefore, when the line length of the line conductor 42-1 is λ/2, no electrical effect is caused.

Meanwhile, when the line length of the line conductor 42-1 is appropriately adjusted and changed from λ/2, the adjustment causes a change in the phase of a high-frequency signal to be propagated to the conductor 41-2 via the line conductor 42-1 and the phase of a high-frequency signal to be propagated to the conductor 41-1 via the line conductor 42-1. Furthermore, this causes changes in the phases of high-frequency signals to be emitted from the ends 43-1, 43-2, 44-1, and 44-2. As in the case of the line conductor 42-1, appropriate adjustment of the line length of the line conductor 42-2 causes changes in the phases of high-frequency signals to be emitted from the ends 43-3, 43-4, 44-3, and 44-4. Therefore, the conductor 41 and the line conductor 42 with an appropriately adjusted line length provided in the waveguide microstrip line converter 10, enable emitted high-frequency signals to cancel each other, and enable reduction in radiation of electromagnetic waves from the entire waveguide microstrip line converter 10.

The waveguide microstrip line converter 10 can also transmit a high-frequency signal propagated through the microstrip line 35 to the waveguide 14. High-frequency signals to be propagated in the minus Y direction are input to the microstrip line 35-1 and the microstrip line 35-2. The phase of a high-frequency signal to be input to the microstrip line 35-1 and the phase of a high-frequency signal to be input to the microstrip line 35-2 are opposite to each other. As in propagation of a high-frequency signal from the waveguide 14 to the microstrip line 35, the waveguide microstrip line converter 10 can also reduce power loss in propagation of a high-frequency signal from the microstrip line 35 to the waveguide 14.

According to the first embodiment, the first, second, and third impedance transforming units 32, 34, and 33 each having a role in impedance matching between the conversion unit 31 and the microstrip line 35 are provided in the waveguide microstrip line converter 10. As a result, the waveguide microstrip line converter 10 can reduce radiation of electromagnetic waves to reduce power loss. In addition, the conductor 41 and the line conductor 42 provided in the waveguide microstrip line converter 10 enable the waveguide microstrip line converter 10 to reduce radiation of electromagnetic waves and reduce power loss. As a result, the waveguide microstrip line converter 10 can obtain high electrical performance even if no through-hole is provided in the dielectric substrate 11.

Furthermore, in the waveguide microstrip line converter 10, the microstrip lines 35-1 and 35-2 are continuously extend in the Y-axis direction from the ends 38-1 and 38-2 of the third portion, respectively. The end 38-1 is an end on the plus X direction side. The end 38-2 is an end on the minus X direction side. The waveguide microstrip line converter 10 can achieve a configuration in which the microstrip line 35 extends in the direction of the long side of the open end 16 while reducing unnecessary electromagnetic wave radiation. As a result, the waveguide microstrip line converter 10 can obtain high electrical performance.

The waveguide microstrip line converter 10 does not require a through-hole in the dielectric substrate 11. It is thus possible to simplify a manufacturing process and reduce manufacturing cost by omitting the processing of a through-hole. In addition, the waveguide microstrip line converter 10 can avoid a situation where electrical performance is deteriorated due to breakage of a through-hole. Therefore, it is possible not only to improve reliability but also to obtain stable electrical performance. When the waveguide microstrip line converter 10 is used for a feeder circuit of an antenna device, the antenna device can obtain stable transmission power and reception power. As described above, the waveguide microstrip line converter 10 achieves the effect of enabling stable and high electrical performance to be obtained, reliability to be improved, and leakage of electromagnetic waves to be reduced.

In the waveguide microstrip line converter 10, there is a possibility where electromagnetic waves are unnecessarily radiated from the slot 15 or from some portions of the line conductor 13 where line width is discontinuous. The waveguide microstrip line converter 10 can adjust the phase of an electromagnetic wave to be radiated, by adjusting the size of the slot 15, adjusting the size of each portion of the line conductor 13, or adjusting the size of the conductor 41 and the line conductor 42. Unnecessary electromagnetic wave radiation from the waveguide microstrip line converter 10 in the plus Z direction, which is a specific direction, may be reduced by adjustment of the phases of electromagnetic waves to be radiated. Adjustment may be performed such that electromagnetic wave radiation is evenly diffused in all directions so as to reduce unevenness of electromagnetic wave radiation that involves an increase of electromagnetic wave radiation in a specific direction among all the directions. With such adjustment as well, the waveguide microstrip line converter 10 can obtain high electrical performance.

Note that the position of the conductor 41 is not limited to the position described in the first embodiment, and may be changed as appropriate. The number and shape of the conductors 41 are not limited to the number and shape described in the first embodiment, and may be changed as appropriate. The conductor 41 just needs to be provided at a position adjacent to at least part of the conversion unit 31 in the line conductor 13. The conductor 41 provided at a position adjacent to at least part of the conversion unit 31 enables emitted high-frequency signals to cancel each other and leakage of electromagnetic waves to be reduced in the waveguide microstrip line converter 10.

Figure 7:
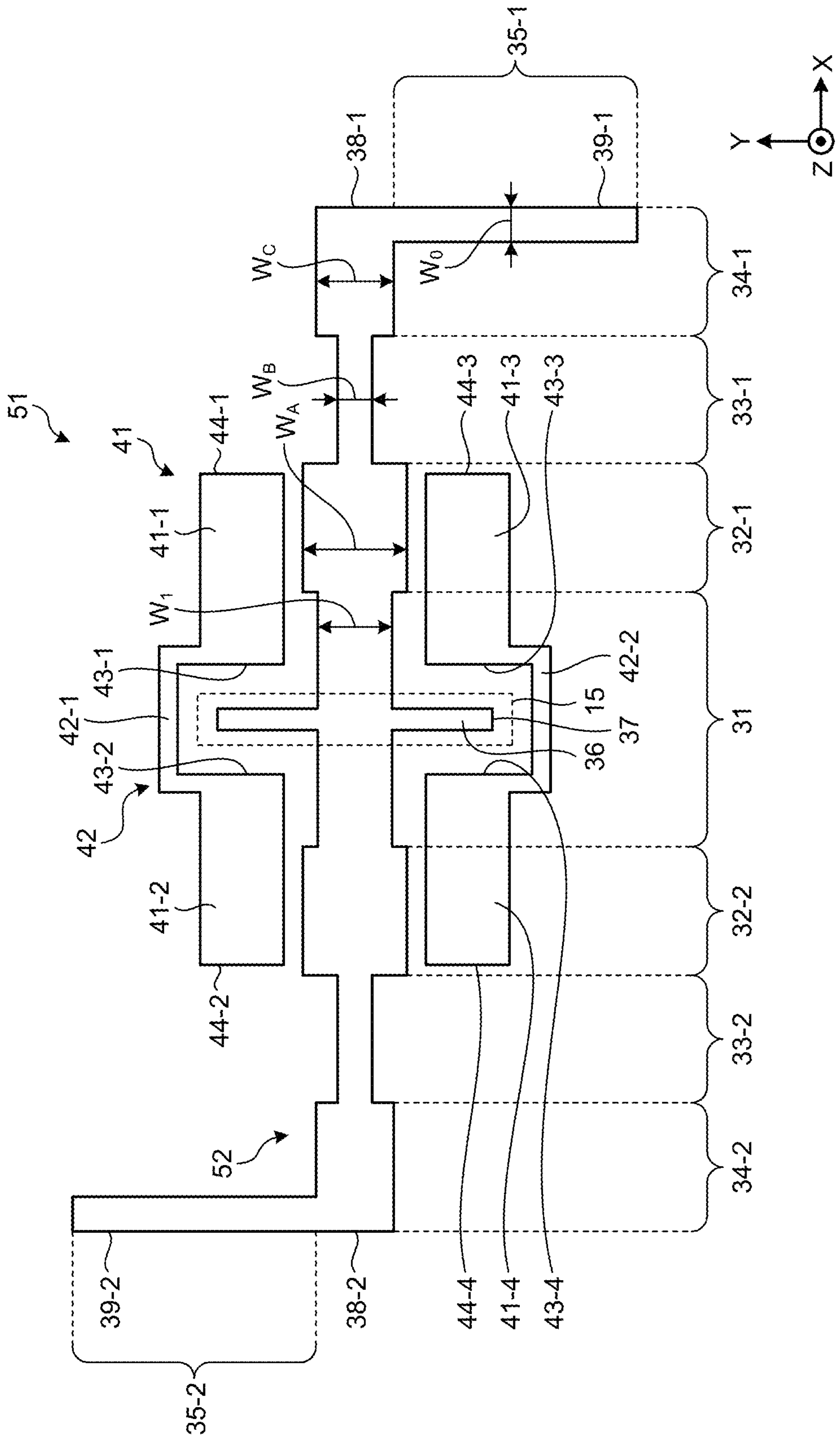
FIG. 7 is a plan view of line conductors and conductors included in a waveguide microstrip line converter according to a first modification of the first embodiment.

FIG. 7 is a plan view of the line conductors 42, a line conductor 52, and the conductors 41 included in a waveguide microstrip line converter 51 according to a first modification of the first embodiment. For reference, the slot 15 is indicated by a broken line in FIG. 7. The waveguide microstrip line converter 51 has the same configuration as that of the waveguide microstrip line converter 10 except that two microstrip lines 35 in the line conductor 52 extend in opposite directions from the second impedance transforming units 34. The microstrip line 35-1 extends in the minus Y direction from the second impedance transforming unit 34-1. The microstrip line 35-2 extends in the plus Y direction from the second impedance transforming unit 34-2.

An electromagnetic wave propagated in the plus X direction from the conversion unit 31 through the first impedance transforming unit 32-1, the third impedance transforming unit 33-1, and the second impedance transforming unit 34-1 is propagated in the minus Y direction through the microstrip line 35-1. An electromagnetic wave propagated in the minus X direction from the conversion unit 31 through the first impedance transforming unit 32-2, the third impedance transforming unit 33-2, and the second impedance transforming unit 34-2 is propagated in the plus Y direction through the microstrip line 35-2. In addition, a high-frequency signal to be propagated in the plus Y direction is input to the microstrip line 35-1. A high-frequency signal to be propagated in the minus Y direction is input to the microstrip line 35-2. The waveguide microstrip line converter 51 can obtain stable and high electrical performance as with the waveguide microstrip line converter 10 described above.

Figure 8:
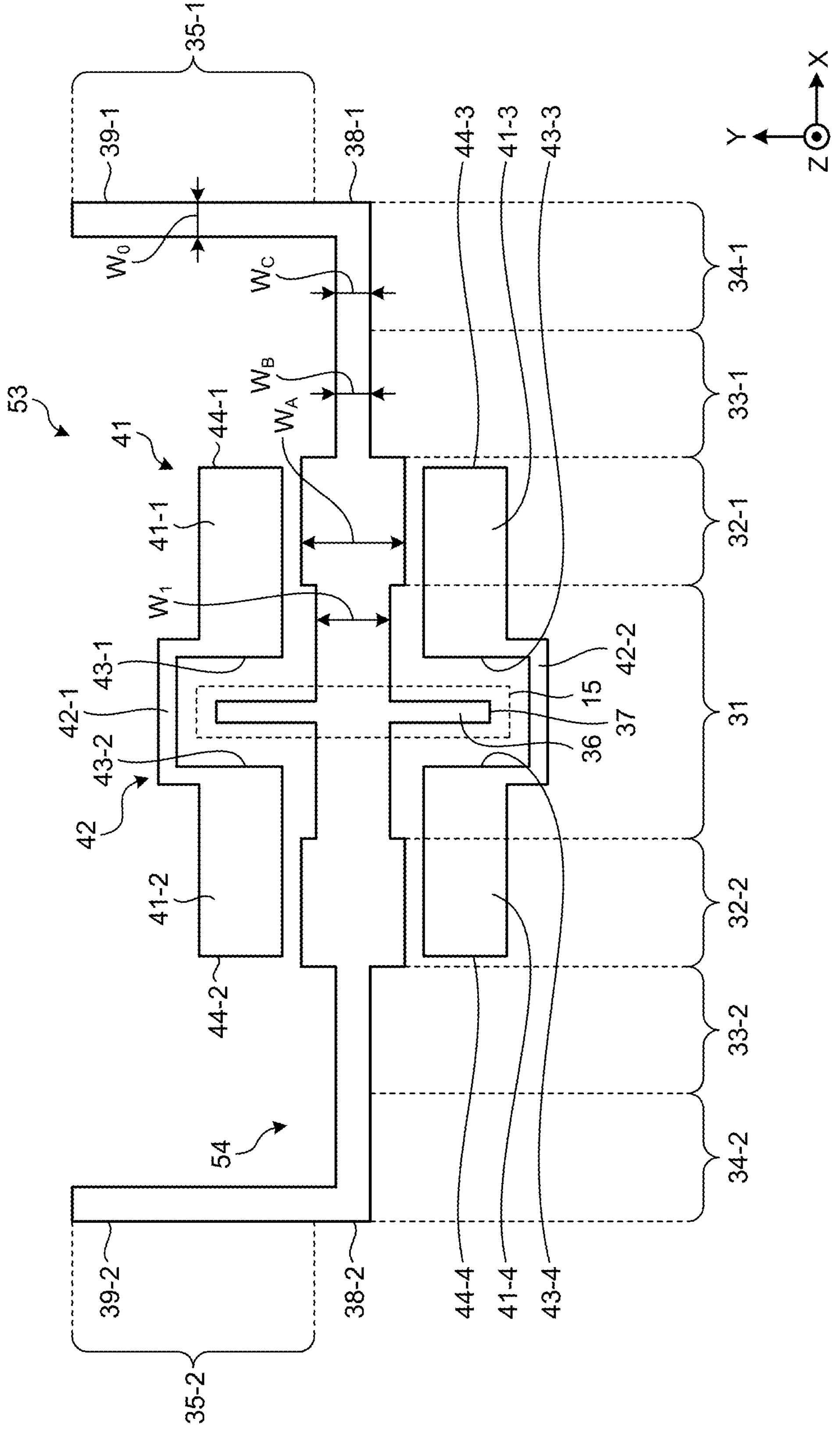
FIG. 8 is a plan view of line conductors and conductors included in a waveguide microstrip line converter according to a second modification of the first embodiment.

FIG. 8 is a plan view of the line conductors 42, a line conductor 54, and the conductors 41 included in a waveguide microstrip line converter 53 according to a second modification of the first embodiment. For reference, the slot 15 is indicated by a broken line in FIG. 8. The waveguide microstrip line converter 53 has the same configuration as the waveguide microstrip line converter 10 except that the line width "$W_C$" of the second impedance transforming unit 34 is equal to the line width "$W_B$" of the third impedance transforming unit 33.

The line width "$W_B$" of the third impedance transforming unit 33 is equal to the line width "$W_0$" of the microstrip line 35. When $W_A$ denotes the line width of the first impedance transforming unit 32, We denotes the line width of the third impedance transforming unit 33, $W_C$ denotes the line width of the second impedance transforming unit 34, and $W_0$ denotes the line width of the microstrip line 35, the following relationship holds between $W_A$, $W_B$, $W_C$, and $W_0$: $W_A > W_B = W_C = W_0$.

In the line conductor 54, the line width of the second impedance transforming unit 34 is equal to the line width of the third impedance transforming unit 33. Therefore, impedance matching between the second impedance transforming unit 34 and the third impedance transforming unit 33 is not performed in the waveguide microstrip line converter 53. As long as radiation of electromagnetic waves is performed at an allowable level and impedance matching can be performed, adjacent transforming units of the third portion may be equal in line width as in the waveguide microstrip line converter 53.

The line width of the second impedance transforming unit 34 and the line width of the third impedance transforming unit 33 are equal to the line width of the microstrip line 35. As a result, a high-frequency signal is propagated through the second impedance transforming unit 34 and the third impedance transforming unit 33 as in the microstrip line 35. Note that the line width of the second impedance transforming unit 34 and the line width of the third impedance transforming unit 33 may be equal to the line width of the microstrip line 35 or may be different from the line width of the microstrip line 35.

In the waveguide microstrip line converter 53, the position of the end 38 in the X-axis direction may be adjusted by adjustment of the line length of the second impedance transforming unit 34 or the line length of the third impedance transforming unit 33. The waveguide microstrip line converter 53 can reduce electromagnetic waves to be radiated by adjusting the position of the end 38 to adjust the amplitudes and phases of the electromagnetic waves to be radiated. The waveguide microstrip line converter 53 can obtain stable and high electrical performance as with the waveguide microstrip line converter 10 described above.

Figure 9:
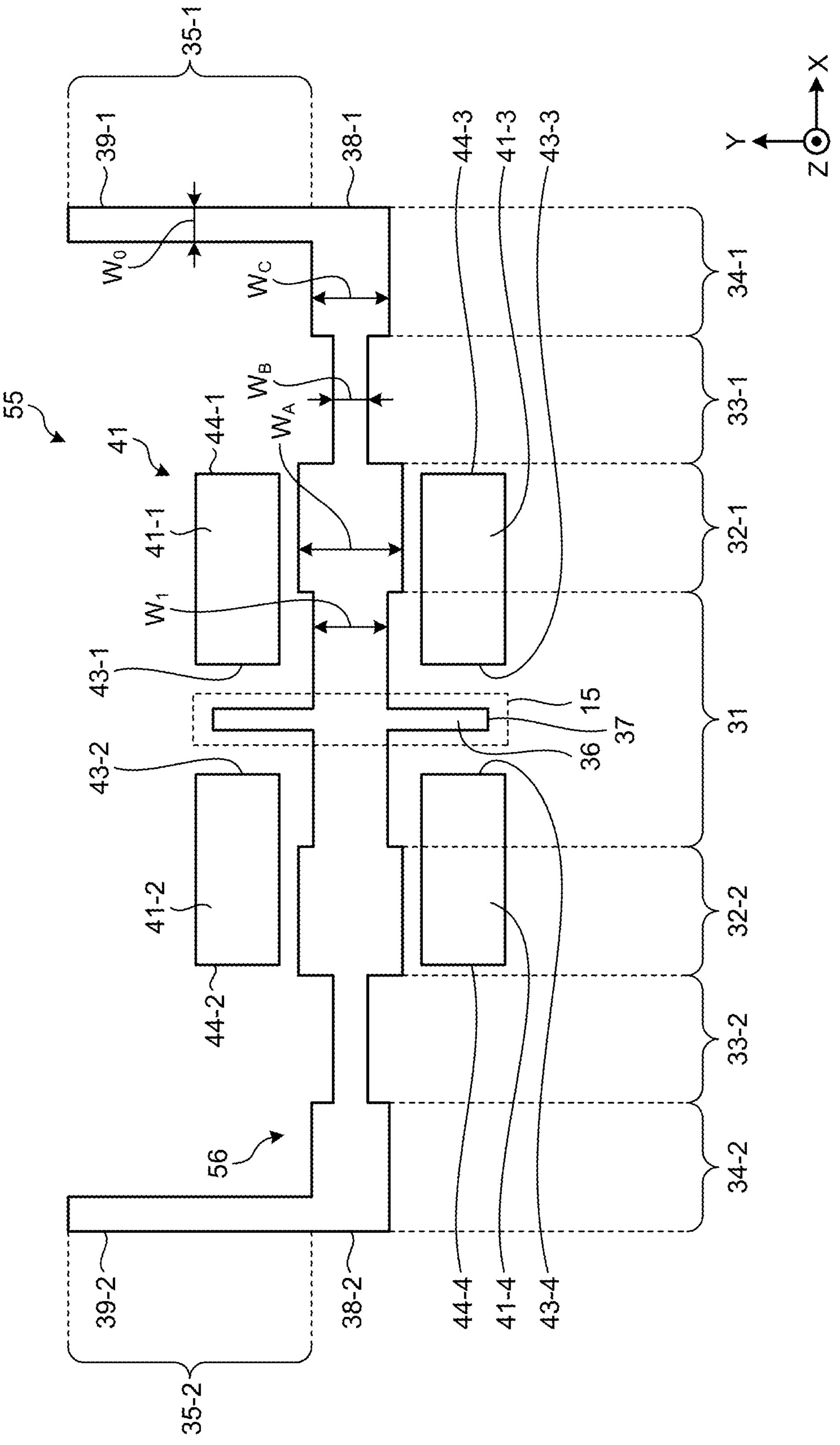
FIG. 9 is a plan view of a line conductor and conductors included in a waveguide microstrip line converter according to a third modification of the first embodiment.

FIG. 9 is a plan view of a line conductor 56 and the conductors 41 included in a waveguide microstrip line converter 55 according to a third modification of the first embodiment. For reference, the slot 15 is indicated by a broken line in FIG. 9. The waveguide microstrip line converter 55 has the same configuration as the waveguide microstrip line converter 10 except that no line conductor 42 is provided.

Because no line conductor 42 is provided in the waveguide microstrip line converter 55, adjustment of emission due to propagation of a high-frequency signal between the conductors 41 is not performed in the waveguide microstrip line converter 55. The waveguide microstrip line converter 55 can adjust emission of high-frequency signals from the ends 43 and 44 by adjusting the position of the conductor 41 and the shape of the conductor 41. As a result of adjustment of emission of high-frequency signals from the ends 43 and 44, the waveguide microstrip line converter 55 can cause emitted high-frequency signals to cancel each other, and can reduce radiation of electromagnetic waves from the entire waveguide microstrip line converter 55. The waveguide microstrip line converter 55 can obtain stable and high electrical performance as with the waveguide microstrip line converter 10 described above.

Second Embodiment

Figure 10:
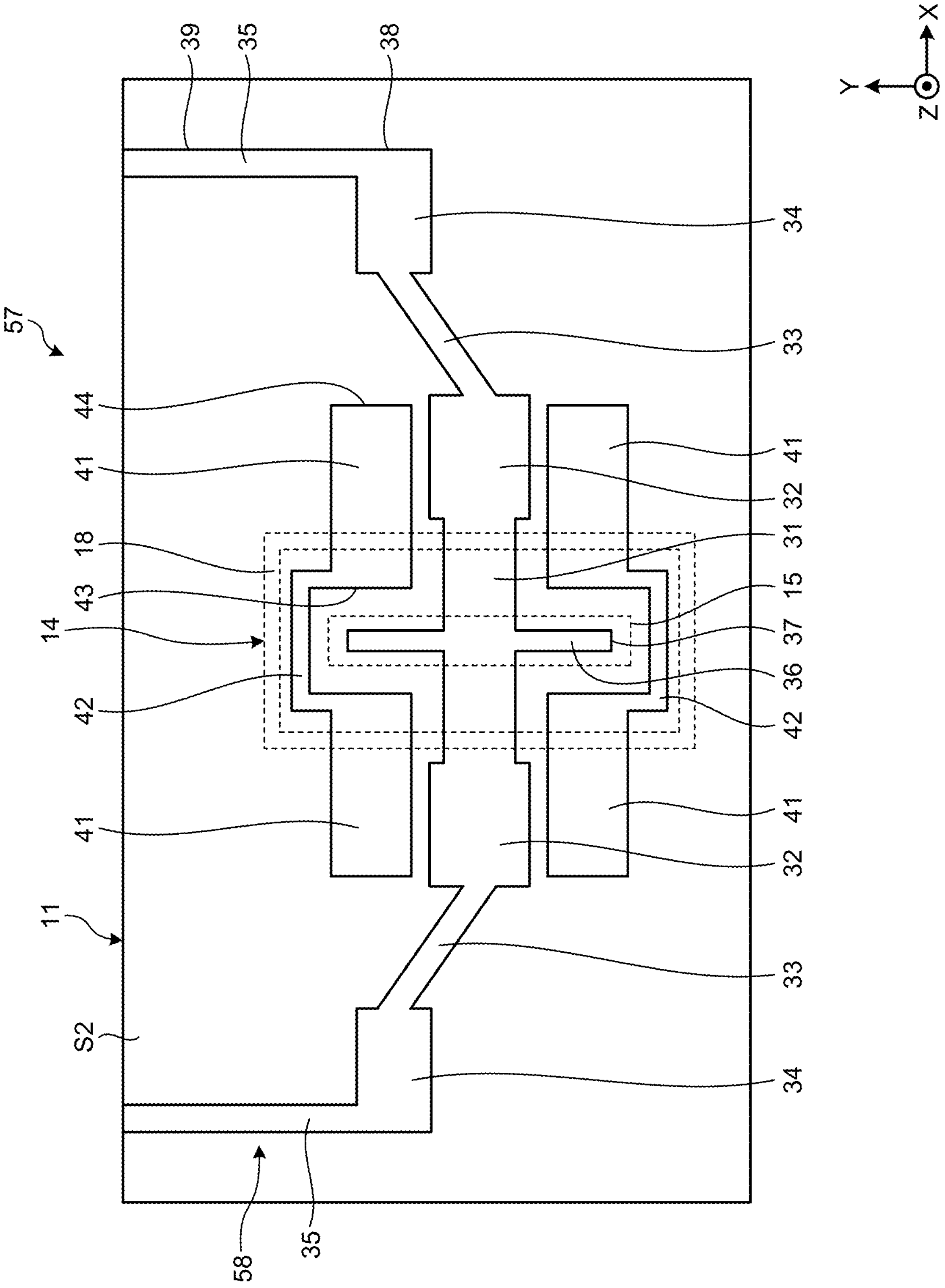
FIG. 10 is a top view of a waveguide microstrip line converter according to a second embodiment of the present invention, in which an external configuration of the waveguide microstrip line converter has been illustrated.

FIG. 10 is a top view of a waveguide microstrip line converter 57 according to a second embodiment of the present invention, in which an external configuration of the waveguide microstrip line converter 57 has been illustrated.

In the third portion of the waveguide microstrip line converter 57, the first and second impedance transforming units 32 and 34 extend in the X-axis direction, and the third impedance transforming unit 33 extends in an oblique direction between the X-axis direction and the Y-axis direction. In the second embodiment, the same constituent elements as those in the first embodiment are designated by the same reference numerals, and a configuration different from that in the first embodiment will be mainly described.

Figure 11:
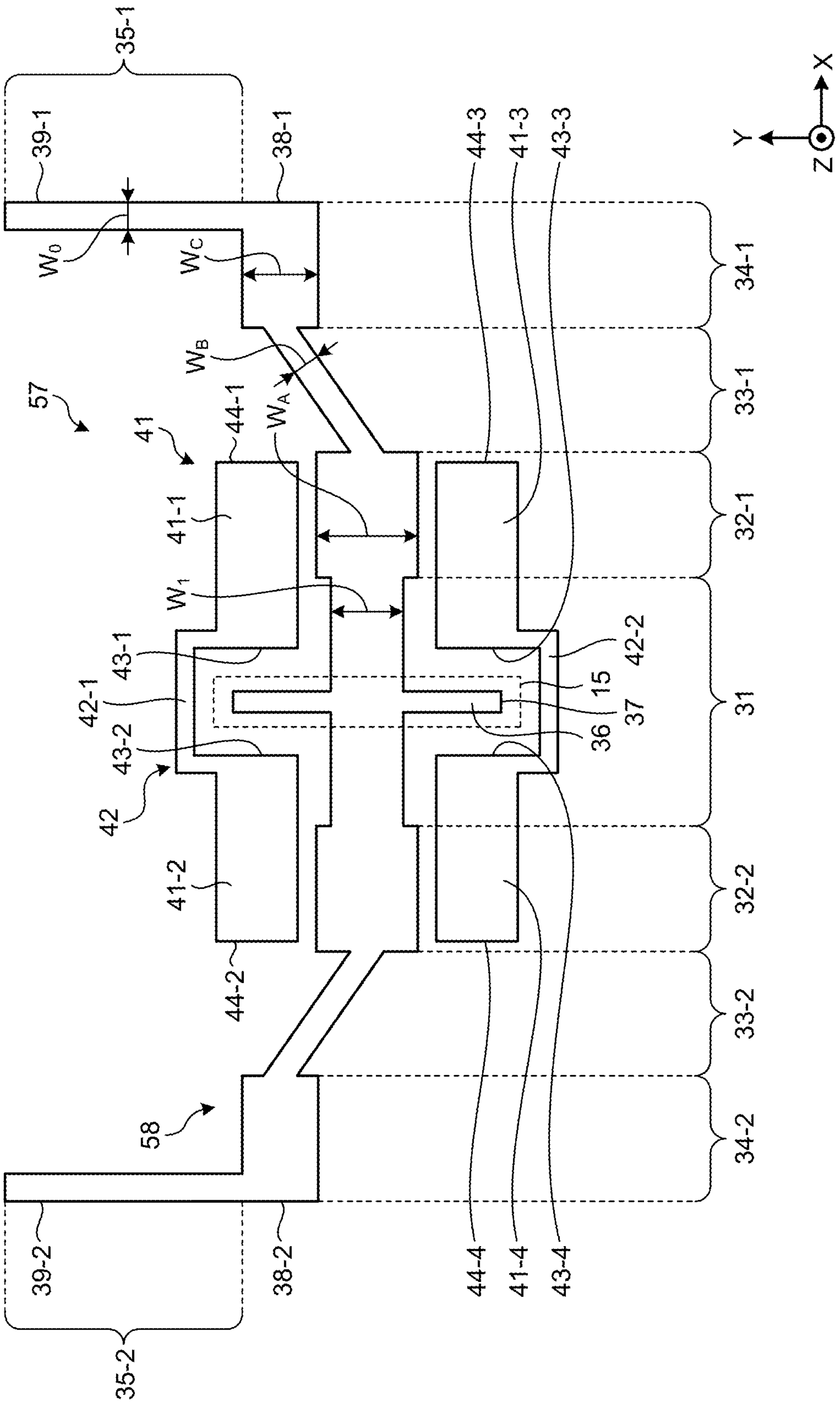
FIG. 11 is a plan view of line conductors and conductors included in the waveguide microstrip line converter illustrated in FIG. 10.

FIG. 11 is a plan view of the line conductors 42, a line conductor 58, and the conductors 41 included in the waveguide microstrip line converter 57 illustrated in FIG. 10. For reference, the slot 15 is indicated by a broken line in FIG. 11. The first impedance transforming unit 32-1 is located on the plus X direction side of the conversion unit 31. The third impedance transforming unit 33-1 extends from the first impedance transforming unit 32-1 in an oblique direction between the plus X direction and the plus Y direction. The center of the second impedance transforming unit 34-1 in the Y-axis direction is shifted toward the plus Y direction side with respect to the center of the first impedance transforming unit 32-1 in the Y-axis direction. The third impedance transforming unit 33-1 forms a transmission line extending in the oblique direction with respect to the X-axis direction and the Y-axis direction. In the third impedance transforming unit 33-1, line width refers to width in a direction perpendicular to the oblique direction, and line length refers to length in the oblique direction. The third impedance transforming unit 33-1 may have any line length.

The first impedance transforming unit 32-2 is located on the minus X direction side of the conversion unit 31. The third impedance transforming unit 33-2 extends from the first impedance transforming unit 32-2 in an oblique direction between the minus X direction and the plus Y direction. The center of the second impedance transforming unit 34-2 in the Y-axis direction is shifted toward the plus Y direction side with respect to the center of the first impedance transforming unit 32-2 in the Y-axis direction. The third impedance transforming unit 33-2 forms a transmission line extending in the oblique direction with respect to the X-axis direction and the Y-axis direction. In the third impedance transforming unit 33-2, line width refers to width in a direction perpendicular to the oblique direction, and line length refers to length in the oblique direction. The third impedance transforming unit 33-2 may have any line length.

In the line conductor 58, the third impedance transforming unit 33 that is the smallest in line width among the first, second, and third impedance transforming units 32, 34, and 33 is a transmission line extending in the oblique direction. The waveguide microstrip line converter 57 can more easily achieve a configuration in which the transmission line extending in the oblique direction is included in the third portion than in the case where the first impedance transforming unit 32 or the second impedance transforming unit 34 is configured as the transmission line extending in the oblique direction.

In the waveguide microstrip line converter 57, the position of the end 38 in the X-axis direction may be adjusted by adjustment of the line length of the third impedance transforming unit 33 or the direction of the third impedance transforming unit 33. The waveguide microstrip line converter 57 can reduce electromagnetic waves to be radiated by adjusting the position of the end 38 to adjust the amplitudes and phases of the electromagnetic waves to be radiated.

In the waveguide microstrip line converter 57, the position of the second impedance transforming unit 34 is shifted in the plus Y direction as compared with the configuration in the first embodiment. The waveguide microstrip line converter 57 can reduce the length of a transmission line extending from the conversion unit 31 to the microstrip line 35 by shifting the position of the second impedance transforming unit 34 in the plus Y direction in the configuration in which the microstrip line 35 extends from the second impedance transforming unit 34 in the plus Y direction. Power loss due to the nature of the material of the dielectric substrate 11 and power loss due to the electric conductivity of the line conductor 58 are substantially proportional to the line length of the entire line conductor 58. Therefore, the waveguide microstrip line converter 57 can reduce the length of the transmission line extending from the conversion unit 31 to an end of the microstrip line 35, the end being located on the plus Y direction side. As a result, the waveguide microstrip line converter 57 can reduce power loss due to transmission of a high-frequency signal.

As with the waveguide microstrip line converter 10 of the first embodiment, the waveguide microstrip line converter 57 can reduce power loss due to unnecessary electromagnetic wave radiation. As with the waveguide microstrip line converter 10 of the first embodiment, the waveguide microstrip line converter 57 can not only improve reliability but also obtain stable electrical performance. As a result, the waveguide microstrip line converter 57 achieves the effect of enabling stable and high electrical performance to be obtained and reliability to be improved.

In the waveguide microstrip line converter 57, one or two of the microstrip lines 35-1 and 35-2 may extend in the minus Y direction from the second impedance transforming units 34-1 and 34-2, respectively. In this case, the third impedance transforming unit 33 in the third portion adjacent to the microstrip line 35 extending in the minus Y direction, may extend in an oblique direction between the X-axis direction and the minus Y direction from the first impedance transforming units 32. As a result, the waveguide microstrip line converter 57 can reduce the length of the transmission line.

Figure 12:
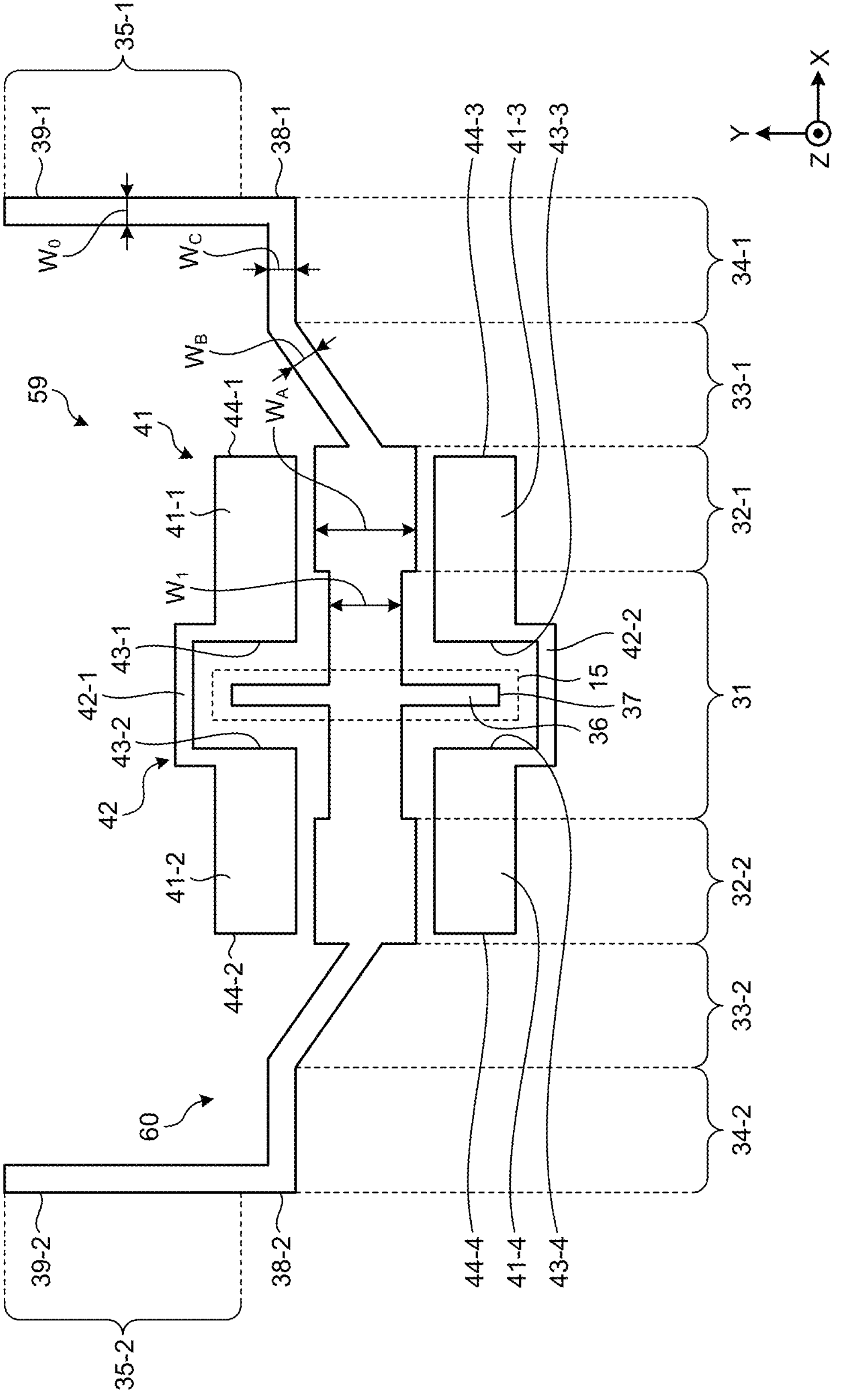
FIG. 12 is a plan view of line conductors and conductors included in a waveguide microstrip line converter according to a first modification of the second embodiment.

FIG. 12 is a plan view of the line conductors 42, a line conductor 60, and the conductors 41 included in a waveguide microstrip line converter 59 according to a first modification of the second embodiment. For reference, the slot 15 is indicated by a broken line in FIG. 12. The waveguide microstrip line converter 59 has the same configuration as the waveguide microstrip line converter 57 except that the line width "$W_C$" of the second impedance transforming unit 34 is equal to the line width "$W_B$" of the third impedance transforming unit 33.

The line width "$W_B$" of the third impedance transforming unit 33 is equal to the line width "$W_0$" of the microstrip line 35. When $W_A$ denotes the line width of the first impedance transforming unit 32, $W_B$ denotes the line width of the third impedance transforming unit 33, $W_C$ denotes the line width of the second impedance transforming unit 34, and $W_0$ denotes the line width of the microstrip line 35, the following relationship holds between $W_A$, $W_B$, $W_C$, and $W_0$: $W_A>W_B=W_C=W_0$.

In the line conductor 60, the line width of the second impedance transforming unit 34 is equal to the line width of the third impedance transforming unit 33. Therefore, impedance matching between the second impedance transforming unit 34 and the third impedance transforming unit 33 is not performed in the waveguide microstrip line converter 59. As long as radiation of electromagnetic waves is performed at an allowable level and impedance matching can be performed, adjacent transforming units of the third portion may be equal in line width as in the waveguide microstrip line converter 59.

The line width of the second impedance transforming unit 34 and the line width of the third impedance transforming unit 33 are equal to the line width of the microstrip line 35. As a result, a high-frequency signal is propagated through the second impedance transforming unit 34 and the third impedance transforming unit 33 as in the microstrip line 35. Note that the line width of the second impedance transforming unit 34 and the line width of the third impedance transforming unit 33 may be different from the line width of the microstrip line 35.

In the waveguide microstrip line converter 59, the position of the end 38 in the X-axis direction may be adjusted by adjustment of the line length of the second impedance transforming unit 34, the line length of the third impedance transforming unit 33, or the direction of the third impedance transforming unit 33. The waveguide microstrip line converter 59 can reduce electromagnetic waves to be radiated by adjusting the position of the end 38 to adjust the amplitudes and phases of the electromagnetic waves to be radiated. The waveguide microstrip line converter 59 can obtain stable and high electrical performance as with the waveguide microstrip line converter 57 described above.

The configurations set forth in the above embodiments show examples of the subject matter of the present invention, and it is possible to combine the configurations with another technique that is publicly known, and is also possible to partially omit or change the configurations without departing from the scope of the present invention.

REFERENCE SIGNS LIST

10, 51, 53, 55, 57, 59 waveguide microstrip line converter; 11, 21 dielectric substrate; 12 ground conductor; 13, 42, 42-1, 42-2, 52, 54, 56, 58, 60 line conductor; 14 waveguide; 15 slot; 16 open end; 17 input-output port; 18 opening edge; 19 tube wall; 31 conversion unit; 32, 32-1, 32-2 first impedance transforming unit; 33, 33-1, 33-2 third impedance transforming unit; 34, 34-1, 34-2 second impedance transforming unit; 35, 35-1, 35-2 microstrip line; 36 stub; 37, 38, 38-1, 38-2, 39, 39-1, 39-2, 43, 43-1, 43-2, 43-3, 43-4, 44, 44-1, 44-2, 44-3, 44-4 end; 41, 41-1, 41-2, 41-3, 41-4 conductor; S1 first surface; S2 second surface.

The invention claimed is:

1. A waveguide microstrip line converter comprising:

a waveguide having an open end;

a dielectric substrate having a first surface and a second surface, the first surface facing the open end, the second surface being located on a side opposite to the first surface;

a ground conductor provided on the first surface and connected to the open end, a slot being provided in a region of the ground conductor, the region being surrounded by an edge of the open end;

a first conductor provided on the second surface, the first conductor being a line conductor through which a signal is propagated; and at least one second conductor provided on the second surface, the at least one second conductor being located at a distance from the first conductor and adjacent to the first conductor, wherein the first conductor includes a first portion, a second portion, and a third portion, the first portion being a microstrip line having a first line width, the second portion being located immediately above the slot and having a second line width larger than the first line width, the third portion extending in a first direction from the second portion and having a role in impedance matching between the first portion and the second portion, the at least one second conductor is adjacent to at least part of the second portion of the first conductor, the third portion includes a plurality of impedance transforming units, each of the plurality of impedance transforming units performing the impedance matching, and one of the plurality of impedance transforming units that is connected to the second portion, has a line width larger than the second line width of the second portion.

2. The waveguide microstrip line converter according to claim 1, comprising:

a plurality of the second conductors; and a third conductor that is a line conductor connecting one of the plurality of second conductors and another of the plurality of second conductors.

3. The waveguide microstrip line converter according to claim 1, wherein the line conductor includes a branch portion branching from the second portion, the branch portion having an open end on a side opposite to a side where the second portion is located.

4. The waveguide microstrip line converter according to claim 1, wherein in each set of impedance transforming units connected to each other among the plurality of impedance transforming units, line widths differ to each other.

5. The waveguide microstrip line converter according to claim 1, wherein the plurality of impedance transforming units includes an impedance transforming unit having a line width smaller than the line width of the second portion.

6. The waveguide microstrip line converter according to claim 1, wherein the plurality of impedance transforming units includes an impedance transforming unit having a line width larger than the line width of the first portion.

7. The waveguide microstrip line converter according to claim 1, wherein the plurality of impedance transforming units includes: an impedance transforming unit forming a transmission line extending in the first direction; and an impedance transforming unit forming a transmission line extending in an oblique direction with respect to the first direction.

8. The waveguide microstrip line converter according to claim 7, wherein the plurality of impedance transforming units includes a first impedance transforming unit, a second impedance transforming unit, and a third impedance transforming unit, the third impedance transforming unit being provided between the first impedance transforming unit and the second impedance transforming unit, the third impedance transforming unit being smaller in line width than both of the first impedance transforming unit and the second impedance transforming unit, and the third impedance transforming unit forms the transmission line extending in the oblique direction.

9. The waveguide microstrip line converter according to claim 1, wherein the first portion is connected to an end of the third portion in the first direction, and extends in a second direction perpendicular to the first direction.

10. A waveguide microstrip line converter comprising:

a waveguide having an open end;

a dielectric substrate having a first surface and a second surface, the first surface facing the open end, the second surface being located on a side opposite to the first surface;

a ground conductor provided on the first surface and connected to the open end, a slot being provided in a region of the ground conductor, the region being surrounded by an edge of the open end;

a first conductor provided on the second surface, the first conductor being a line conductor through which a signal is propagated; and a second conductor provided on the second surface, the second conductor being located at a distance from the first conductor and adjacent to the first conductor, wherein the first conductor includes a first portion, a second portion, and a third portion, the first portion being a microstrip line having a first line width, the second portion being located immediately above the slot and having a second line width larger than the first line width, the third portion extending in a first direction from the second portion and having a role in impedance matching between the first portion and the second portion, the second conductor is adjacent to at least part of the second portion of the first conductor, the first portion is connected to an end of the third portion in the first direction, and extends in a second direction perpendicular to the first direction, and the line conductor includes a branch portion branching from the second portion, the branch portion having an open end on a side opposite to a side where the second portion is located.

11. A waveguide microstrip line converter comprising:

a waveguide having an open end;

a dielectric substrate having a first surface and a second surface, the first surface facing the open end, the second surface being located on a side opposite to the first surface;

a ground conductor provided on the first surface and connected to the open end, a slot being provided in a region of the ground conductor, the region being surrounded by an edge of the open end;

a first conductor provided on the second surface, the first conductor being a first line conductor through which a signal is propagated;

a plurality of second conductors provided on the second surface, the plurality of second conductors being located at a distance from the first conductor and adjacent to the first conductor; and a third conductor that is a third line conductor connecting one of the plurality of second conductors and another of the plurality of second conductors, wherein the first conductor includes a first portion, a second portion, and a third portion, the first portion being a microstrip line having a first line width, the second portion being located immediately above the slot and having a second line width larger than the first line width, the third portion extending in a first direction from the second portion and having a role in impedance matching between the first portion and the second portion, and the plurality of second conductors is adjacent to at least part of the second portion of the first conductor.

* * * * *